United States Patent

[11] 3,565,319

| [72] | Inventor | Hans Peter Eschenbrucher<br>Torrance, Calif. |
|---|---|---|
| [21] | Appl. No. | 638,283 |
| [22] | Filed | May 15, 1967 |
| [45] | Patented | Feb. 23, 1971 |
| [73] | Assignee | Technical Devices Company, a Division of<br>Banner Industries, Inc.<br>Cleveland, Ohio |

[54] APPARATUS FOR APPLICATION OF SOLDER TO CIRCUIT BOARDS
8 Claims, 9 Drawing Figs.

[52] U.S. Cl. ................................................ 228/37,
228/33, 228/36, 228/43
[51] Int. Cl. .................................................. B23k 1/08
[50] Field of Search ........................................... 228/33, 36,
37; 228/40, 43; 269/254

[56] References Cited
UNITED STATES PATENTS

| 2,688,351 | 9/1954 | Sweet | 269/254x |
| 3,000,342 | 9/1961 | Dorosz et al. | 228/40 |
| 3,037,274 | 6/1962 | Hancock | 228/37x |
| 3,056,370 | 10/1962 | Barnes et al. | 29/471.1x |
| 3,266,136 | 8/1966 | Gutbier | 29/471.1x |
| 3,277,566 | 10/1966 | Christensen | 29/471.1x |
| 3,298,588 | 1/1967 | Shomphe | 228/33x |
| 3,303,983 | 2/1967 | Patrick et al. | 228/1 |

Primary Examiner—John F. Campbell
Assistant Examiner—R. B. Lazarus
Attorney—Richard J. Rengel ABSTRACT: A soldering apparatus comprising an outer tank for holding a supply of molten solder, an inner pressure tank and solder duct means which directs the flow of solder to avoid direct flow and any turbulence of solder in the duct inlet.

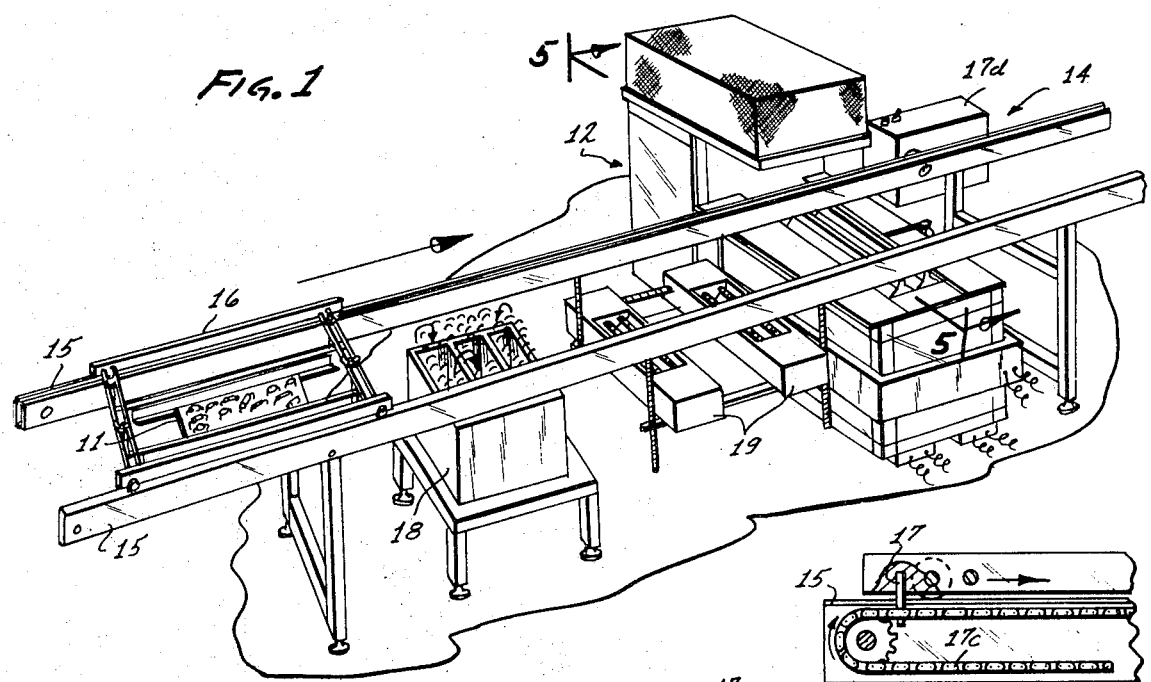
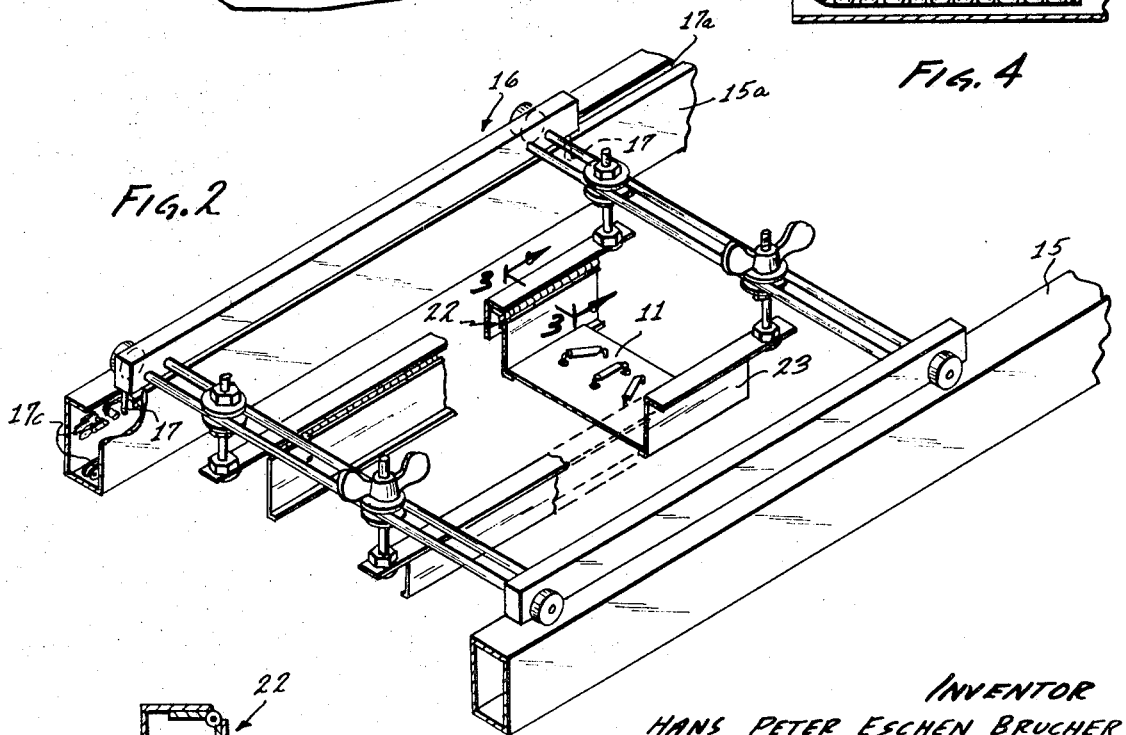
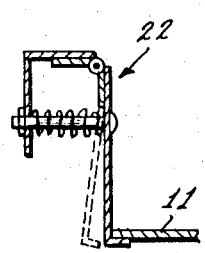

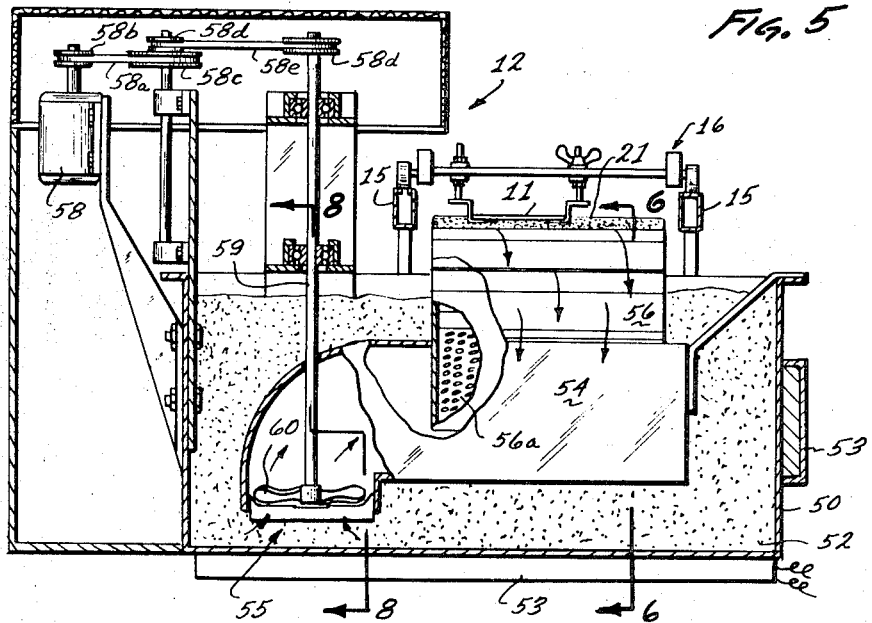
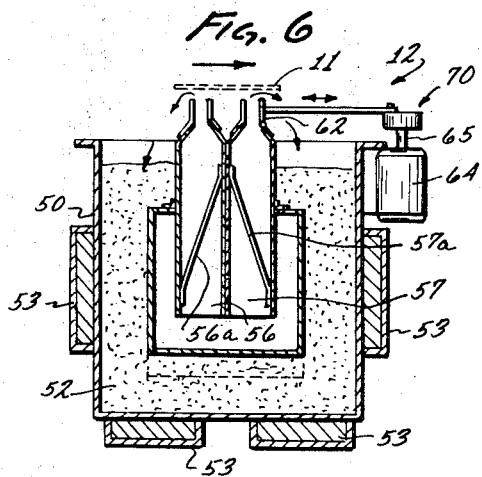
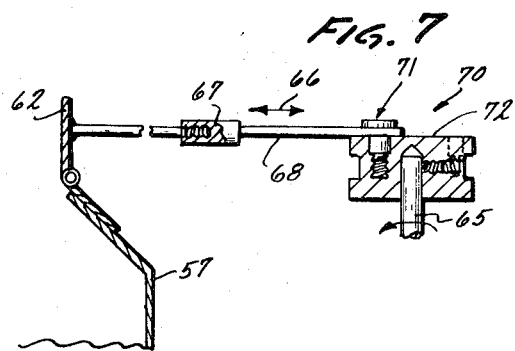
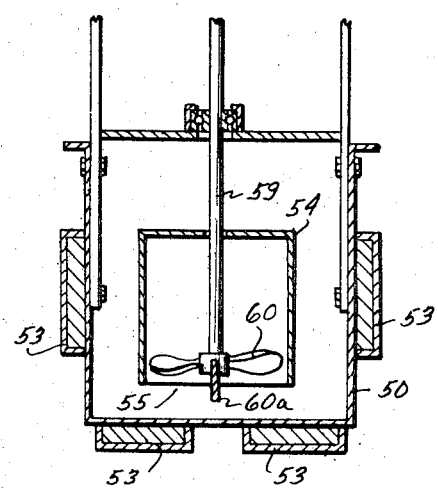
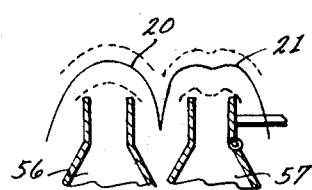

APPARATUS FOR APPLICATION OF SOLDER TO CIRCUIT BOARDS

Apparatus for conveying a series of printed circuit boards and applying molten solder to the copper-clad circuit pattern, component leads, openings and eyelets in the board passing the leads; by drawing molten solder upwardly into an inner pressure tank from the area near the bottom of an outer solder tank containing heated molten solder in order to avoid introduction of dross and other deposits present on the surface of the solder directing the solder laterally in the inner tank to an area about vertical twin ducts or single duct extending from down within the inner tank and projecting to above the surface of the solder in the outer tank wherein the twin duct orifices or orifice produce level standing solder waves or wave of uniform height and substantially free of turbulence for uniform application of solder to the underside of the circuit boards, and an agitator producing vibration of at least one standing solder wave to produce improved wetting action and bonding of the solder in the standing wave to the copper-clad circuit pattern, component leads and penetration of openings by decreasing the surface tension of the applied solder from the standing wave and forcing the solder to penetrate the openings including removal of excess flux including flux entrapment from the openings, copper-clad surfaces, and component leads and further to cause fillets of solder to form around component leads in the openings projecting above the upperside of the circuit boards.

Application of solder to printed circuit boards provides for electrical and mechanical connections of components, i.e., resistor, capacitors, inductors, transistors, integrated circuits, etc., into a circuit of an amplifier, oscillator or combination of circuits according to the particular component arrangement and the circuit pattern formed in the copper-clad underside of the circuit board. Heretofore, various methods have been employed to apply solder to the circuit pattern and leads of the components to connect the components to the circuit pattern including dipping the underside of the circuit board into a pool of molten solder, after applying rosin or organic flux thereto for cleaning to promote "wetting action." More recent developments in solder application have provided pumping molten solder to produce solder waves and passing circuit boards over the waves to make contact with the underside of the circuit boards to apply the solder. While the latter method has provided substantial improvement in the application of solder to the circuit boards, a serious problem still exists in that many circuit boards processed in this manner have faulty solder connections which are not readily apparent until the circuit board has been placed in equipment and subjected to environmental conditions which reveal defects in the bonding of the solder to the circuit pattern and component leads. These defects in bonding have been found to result from contamination, i.e., solder dross and foreign deposits picked up and applied to the circuit boards; poor wetting action resulting in pin holes and voids and inadequate soldering of component leads. Often flux entrapment in component lead openings in the circuit boards prevents solder penetration into the openings and around the leads.

In the type of prior soldering equipment which produces a standing wave, some precautions have been taken to prevent turbulence in the standing wave which have been found to be inadequate, e.g., a honeycomb or "eggcrate" in the solder duct. While these prior methods provide some decrease in turbulence caused by the pumping of solder, the mere placement of a honeycomb in a duct in which a pump propeller is also present has not been found adequate to produce the desired degree of uniformity in the level of the standing solder wave. The uniformity of the level of the standing wave is critical to providing a solder circuit board because any deviation from this uniformity in level allows the underside of the circuit board to pass over slight dips solder wave without touching the underside in the areas of the wave dips or without applying the solder with sufficient force to the underside to provide the desired "wetting action" and forcing the solder into lead openings or eyelets. In order to understand the need for uniformity in level of a standing wave to provide proper application of solder to circuit boards, it should be noted that any deviation in level greater than the approximate thickness of the circuit board (approximately one thirty-second inch or less), the solder wave at the deviation will not touch the underside of the board. The reason being that in passing the circuit board over the solder wave, the underside is precisely aligned with the crest or top of the solder wave such that the force of solder wave is applied to the underside without permitting solder to flow over the upperside (component side) of the circuit board. The length of circuit board may be slightly at an incline (surfing), since there is a large degree of surface tension of the molten solder which inhibits flow over the side or near edges of the circuit board during processes. To some extent this allows for a "floating action" due to surface tension of the solder wave and also the inhibition to "wetting action" of the plastic or other base material of the circuit board.

The present invention overcomes the foregoing problems in providing improved circuit connections and application of solder to circuit boards by an improved conveyor and soldering machine which provide for more uniform application of solder by improved arrangement for producing more uniform standing waves of solder which are free to from surface contamination of dross or other foreign deposits. Further, the present invention provides a novel mode of application of solder by decreasing surface tension of the standing wave of solder to provide substantial improvement in "wetting action" and further to produce "through-hole" penetration of solder in circuit board openings and around component leads to form solder fillets projecting above the circuit board. The resulting circuit connections formed by the solder in the aforesaid manner have been found to provide substantially superior circuit connections to those provided by prior solder processing of circuit boards. Accordingly, the present invention not only substantially eliminates visible solder gaps in intended circuit connections of prior circuit boards, requiring repeated processing of the circuit boards; but also eliminates the costly replacement of circuit boards, which fail only after a relatively short time period of use in environmental conditions of a system when poor or inadequate bonding of solder of circuit connections become known only after use in equipment because of inoperativeness of the circuit in the equipment. Further, the present invention provides for more uniform controllable transmission line impedance and also minimizes undesired introduction of resistance or distributed capacitance because of the lack of control of application and bonding of the solder to intended areas. In many instances high-speed integrated circuits mounted on circuit boards are not capable of operating unless the impedance of circuit paths is minimal or at least can be controlled precisely, e.g., between integrated emitter follower circuits (ECL). As is evident from the foregoing, the necessary step of soldering to make circuit connections takes on increased importance where uniformity of solder application is in itself critical to the circuit operation. Accordingly, not only must the circuit connections be assured, but also the solder application must be made uniformly to avoid unpredictable variations in impedance resulting from variation in width, thickness or area of the solder on circuit patterns, component leads and other connections. Accordingly, it is an object of the present invention to provide soldering apparatus which overcomes the problems and disadvantages of prior circuit soldering processing apparatus and provide the features and advantages of improved circuit connections and uniform application of solder of the present invention.

The invention and its advantages will be further understood by reference to the detailed description and drawings wherein:

FIG. 1 is a pictorial view which shows the soldering apparatus of the present invention.

FIG. 2 shows a portion of the conveyor of the soldering apparatus including an adjustable circuit board carrier.

FIG. 3 is a detail view showing a cross section of a spring-biased clamping section of the board carrier taken along the line 3–3 of FIG. 2 in the direction of the arrows.

FIG. 4 is a detail view of an end portion of the conveyor shown in FIG. 1 for showing an end gear, portion of the drive chain and card carrier.

FIG. 5 is a cross-sectional view of the soldering machine shown in FIG. 1 and taken along line 5–5 in the direction of the arrows and broken away to show certain details of interior of the soldering machine of the present invention.

FIG. 6 is another cross-sectional detail view of the tanks, ducts and solder wave agitator of the soldering machine as indicated by the line 6–6 of FIG. 5 in the direction of the arrows.

FIG. 7 is an enlarged detail view of the agitator apparatus of the soldering machine also shown in FIG. 6.

FIG. 8 is a detail view taken along line 8–8 of the solder intake to pressure tank or chamber of the soldering machine of the present invention.

FIG. 9 is an enlarged detail view of the individual solder duct outlets or nozzles for illustrating the separate, individual molten solder waves produced by the soldering machine of the present invention.

Referring now to the drawings for a detailed description of soldering apparatus of the present invention, FIG. 1 shows the soldering apparatus to include a soldering machine 12, circuit board conveyor 14, board carrier 16, solder flux tank 18, and circuit card preheaters 19. Printed circuit board 11 is removably, but rigidly clamped in the carrier 16 which is transported by the conveyor 14 in the direction of the arrow to first pass over the bubbling flux of flux tank 18 to produce a coating of flux on the underside of printed circuit board 11, including copper-clad printed circuitry and circuit component leads projecting through openings in the board from circuit components on the upperside of the underside of circuit board 11, in preparation of the copper and component-lead surfaces for adherence to the solder to be applied by soldering machine 12. The flux is a noncorrosive electrical flux which cleans and prepares copper or plated circuit pattern (including copper-clad areas and component leads) for "wetting" and intermetallic bonding of the copper to solder applied thereto by the soldering machine 12.

After application of flux and prior to solder application, the circuit board 11 is next passed over preheaters 19 which preheat the circuit boards to condition the circuit boards for higher temperatures of the molten solder (e.g., 510° F.) encountered during application of molten solder by solder wave produced by soldering machine 12. Thus, preheating of circuit boards 11 prevents sudden extreme temperature changes or "heat shock" to boards 11 and possible damage induced by expansion or nonuniform expansion of the boards 11 upon contacting the solder wave 20. The details of operation of the soldering machine 12 are described infra, and it shall suffice at present to state merely that the circuit board 11 is passed over and into contact with the crests of separate standing solder waves 20 and 21 shown in FIGS. 6 and 9, to provide a uniform application of solder to the copper-clad portions (circuitry pattern) of the undersurface, of circuit board 11 and component leads including penetration of the solder into openings passing the leads from components of top of the board to the underside of circuit board 11.

In FIG. 2, the carrier 16 is shown supported for movement on conveyor rails 15, 15a by rollers on sides of the carrier frame. Pins 17 are secured to one of the sides of the carrier frame and project down through a longitudinal slot 17a, extending the length of the slotted rail 15a, to seat in a respective pair of openings in the links of a continuous length of drive chain 17c (FIGS. 2 and 4). Chain 17c is driven by an adjustable speed drive including a motor disposed in a housing 17d (FIG. 1) which is coupled to the chain 17c by a drive gear disposed within adjacent rail 15 and engaging links of opposing lengths of chain 17c to move the chain 17c (e.g., 5 feet per minute) in the direction shown in FIG. 4. End follower gears are rotatably mounted at the ends of rail 15 as shown for the near end of the slotted rail 15a in FIG. 4.

The conveyor 14 is adapted to transport many of the carriers 16 at one time in series to provide for substantially continuous processing of circuit boards 11 in a series of carriers 16 (only one shown). As shown in FIG. 2, the carrier 16 suspends the circuit board 11 horizontally or at a slight incline (slightly higher at the leading edge of board 11 as adjusted by suspension screws) between the rails 15 to expose the underside to flux and to engage the crest of twin solder waves 20 and 21 (FIGS. 6 and 9). The circuit card 11 is rigidly clamped between elongated clamping rails 22 and 23 which are adjustably positioned on lateral sections of the frame of the carrier 16 by suitable fastening means as shown in detail in FIG. 3. Rigid clamping of the board 11 during processing reduces the possibility of warpage or bending particularly during preheating, application of molten solder and cooling thereafter. The distance between lateral sections is adjusted to the width of the circuit board 11 (usually a large number in a series of boards being soldered). One section of carrier 16 is spring biased, as shown in FIG. 3, to clamp the circuit board 11 between opposing clamping sections to facilitate rapid top insertion of the board 11 in the carrier prior to processing and removal of the board 11 after processing.

Referring now to FIGS. 5 to 9 for a detailed description of the soldering machine 12 of the soldering apparatus shown in FIG. 1, the interior details of the soldering machine 12 are shown in FIG. 5 to include an outer solder tank or melting tank 50 for molten solder 52 which is heated to a molten state (e.g., 510° F.) by heater elements 53 secured to the bottom and side of the solder container 50. Within the outer solder tank 50 and inner tank 54 a pressure chamber is formed for producing a flow of solder through a circular intake 55, which opens downwardly toward the bottom of the solder tank 50. A propeller 60 (or impeller) is disposed in the intake 55 to force molten solder 52 from the bottom of tank 50 through the intake 55 and into the inner tank 54. As shown in FIGS. 5 and 6, the inner tank 54 includes an arcuate section formed to direct upward flow of the molten solder from the intake 55 horizontally to the central area of inner tank 54 which central area includes twin ducts 56 and 57 extending from near the bottom of the inner tank 54 and projecting vertically through the upper wall thereof and above the level of the solder 52 to approximately 1 inch above the rim of outer solder tank 50. As shown in FIGS. 5 and 8a, vane 60a, contoured to pass blades of propeller 60, is secured to the sides of intake 55 inner tank 54 to prevent vortex formation by the moving propeller 60.

The heater elements 53 are connected to a thermostatic heater control (not shown) and electrical power source which provides for adjusting the temperature of the molten solder 52 in the solder container 50. The temperature of the solder, i.e., electronic solder consisting of approximately 37 percent lead and 63 percent tin, is in a solid state at or below approximately 382° F. and liquid (molten) above 382° F. In operation, the temperature of molten solder is regulated to approximately 510° F. for operational speed of movement of the circuit boards over the solder waves at a rate of 5 feet per minute, for example. The solder used herein is one of the general types referred to as "eutectic" solder which goes directly from the liquid state to the solid state without passing through a "plastic," i.e., semisolid or formable state. It is important that the solder not go through the "plastic" state to prevent discontinuities or "fractures" in solder connections on the circuit board and "open" circuits in the completed soldered board. This is apt to occur when the circuit board 11 is moved and the type of solder used were permitted to pass through a "plastic" state during movement of the circuit board 11 in the continuous or assembly line soldering process provided by the soldering apparatus of the present invention.

The upper ends of the twin ducts 56 and 57 are individually tapered above the height of the rim of the solder tank 50 to form narrow, elongated rectangular orifices extending horizontally above the level of the solder in order to project standing solder waves 20 and 21, normal to the rails 15 of the conveyor 14, to a height of approximately one-half inch above the orifices, for example, (and in the range from 0 to 1 inch)

to engage the underside of the circuit board 11 and penetrate openings therein. As a result, each of the standing waves 20, 21, contacts the undersurfaces of the circuit cards 11 passing over orifices of twin ducts 56, 57 of the soldering machine 12 directing the molten solder against the underside of the cards 11 such as to force the solder into openings in the cards which pass component leads therethrough to form fillets of solder (cone of solder having a concave surface) wherein the peak of the solder fillets project above the upperside of the cards 11. These fillets of solder are present after the solder has cooled and hardened and are not necessarily of this shape during the application of molten solder when the molten solder is forced into the board openings and around the component leads in the openings and even above the upperside of cards 11. The component leads are of either rectangular or round cross section. The rectangular leads tend to block the round openings in the circuit board 11 to make penetration by the solder to form fillets. The molten solder does not flow laterally above the upperside of cards 11, around openings because of molten solder surface tension and lack of of "wetting" of the upperside, but forms about the component leads and the molten solder does not normally project high enough to engage the components themselves, i.e., the molten solder penetrates through the individual openings and above the upperside of the cards 11. Retention of the solder about each lead of components mounted on the cards to form fillets instead of merely returning because of lack of wetting action and removal of excess flux will be understood from the description of the operation infra.

Disposed within the twin ducts 56 and 57, are perforated sheets 56a and 57a which are secured diagonally in the respective ducts as shown in FIG. 6 to produce, in conjunction with the configurations and arrangement of the pressure tank 54 and ducts 56, 57 a uniform distribution and laminar flow of the molten solder 52 in the respective ducts for standing waves 20 and 21 of uniform height or level across the width of the respective ducts as viewed in FIG. 9. Because of the uniform flow of molten solder 52 expelled by the ducts 56 and 57 there is no visible turbulence of the surface of the waves 20, 21 at the respective orifices. The uniform height and absence of visible turbulence is important to uniform application of solder across the width of each of the circuit boards 11 whereby substantially equal pressure or force of the solder is uniformly applied across the underside of the entire board while passing over the standing waves 20, 21 to produce uniform soldering of copper-clad areas and leads of all components across each of the circuit boards 11. The diagonal disposition of the perforated plates 56a, 57a in ducts 56, 57 respectively, provides for uniform distribution of flow of solder through respective duct orifices without undue restriction of solder flow through the ducts whereby a larger flow of solder is provided without requiring excessive pumping, turbulence and pressure in the pressure tank 54. This reduces the pumping requirements placed on the pump including propeller 56, driving linkage and supports and bearings therefore, and adjustable speed drive motor 58 as shown in FIG. 5. More important, the reduction in pumping requirements reduces tendency for turbulence in the pressure tank 54 produced by rotation of propeller 60.

Control of the height of the solder waves 20 and 21 is provided by adjustment of sheave diameter of variable-speed driving pulley 58b of AC synchronous motor 58 (FIG. 5). Since the height of the standing waves is so important to uniform application of solder to boards 11, variation in speed due to overload of motor 58 is purposely avoided and would not normally occur in operation of the solder machine. In conjunction therewith, the motor 58 is coupled to the drive shaft 59 for propeller 60 by variable-speed pulley 58b, v-belt 58a, idler pulley 58c and timing pulleys 58d and timing belt 58e, as shown in FIG. 5, to maintain a constant speed of rotation of propeller 60 for any speed setting of pulley 58b. This, in turn, provides a constant pressure in pressure tank 54 for constant height soldering waves 20 and 21, respectively, for the particular constant speed setting of pulley 58b. The desired height of the solder waves 20, 21 is determined by the primary factor of vertical projection of leads below the underside of the boards 11 in order to clear the upper edge of ducts 56, 57, i.e., upper edges about orifices of ducts 56, 57 and also, to provide the proper height for solder fillets around the leads. Further, the pump drive provided by the timing belt 58c and timing pulleys 58d, in addition to providing constant speed for any pulley speed setting, also provide the desired speed reduction between motor 58 and propeller drive shaft 59 while substantially eliminating the transverse force on the motor shaft, follower shaft, and propeller shaft and specifically, the elimination of side load on shaft bearings in the high temperature environment which would be produced by common friction pulleys and belts. As a result, this additional advantage is provided in eliminating undue wear on motor bearings, in particular, and also follower and propeller shaft bearings for a significant reduction in "downtime" of the soldering apparatus. Since in many instances, only a single soldering machine is available in a production facility and these bearings have been subject to excessive heat and subsequent wear in the past a considerable advantage is obtained by not only reducing repair costs, but also to decrease the "downtime" of the machine without excessive preventive maintenance to prevent "breakdown" during peak periods of demand or need for solder processing of circuit boards 11.

An important feature of the present invention is provided by the agitator 70 which is shown in detail views of FIGS. 6 and 7. One of the most difficult problems that has not been effectively overcome prior to the present invention, is to eliminate voids and "pinholes" in the coating of solder and promote "-flowthrough" of the soldered circuit board 11. The agitator 70 produces a uniform vibration in the solder wave 21 which increases the "wetting" action of the copper-clad circuit pattern areas of board 11 and solder penetration of openings for component leads by effectively repeated application of the solder to the copper-clad areas, openings and leads. This action not only effectively removes excess flux from the copper-clad circuit pattern areas and board openings, but also washes" at the surface to "wet" areas of the copper-clad surface and component leads, which have a tendency to resist solder adhesion either completely or partially, in order to improve bonding of the solder to the copper-clad areas and component leads, and also prevent pin holes or voids from forming because of "lack-of-wetting" or excess flux clinging to the copper-clad surfaces of the underside of boards 11 or in openings passing component leads. The vibration or agitation, in the preferred embodiment of the invention as shown is produced by oscillating the hinged, upper edge portion or lip 62 of duct 57 (FIGS. 6, 7), which lip 62 is connected to motor 64 by a linkage converting the rotation of the motor drive shaft 65 to a linear oscillating motion as indicated by the arrow 66 in FIG. 7. The amplitude of vibration of the agitator 70 is controlled by adjustment of its radical distance from the shaft 65, i.e., by positioning screw 71 in anyone of a plurality of threaded openings at different radii in the upper surface of circular pulley 72, for example (only two openings are shown in FIG. 7). The length or amplitude of the horizontal travel of rod cross-sectional is adjusted to provide the desired amplitude of vibration necessary and varies with the height of the standing wave 21 wherein a higher wave 21 requires higher amplitude of travel of lip 62 to induce the same vibratory effect as lower amplitude of travel in a lower wave 21. The frequency of oscillation is in the range of 200 to 500 v.p.m. (vibrations per minute) and controlled by adjustment of the speed of motor 64. Adjustment of the length of rod 66 adjusts the cross-sectional area of the orifice of duct 57 and the cross-sectional area of the standing wave 21 (FIG. 9).

The vibration produced in the solder wave 21 is evidenced by the dual crests in this wave 21 as shown in FIG. 9. It appears that the oscillatory rate of lip 62 causes movement of solder wave 21 to cause the crest to dwell at opposite ends of travel of the lip 62 as produced by the agitator linkage. Thus, a moving wave 21 appears to be a standing wave having the overall configuration of the lower case (typed) letter *m*.

In operation, the soldering machine 12, as shown in FIGS. 5 to 8, provides for delivery of a relatively large volume of solder to the orifices of ducts 56, 57 to produce standing waves 20, 21 with a desirable minimum solder capacity of the outer melting tank 50. This is a direct result of the configuration of the inner pressure tank 54 and ducts 56, 57 including diagonal perforated plates 56a, 57a, which provide for a large exchange flow of solder from the outer tank 50 to the orifices of ducts 56, 57 with a minimum of obstruction while providing for a uniform laminar flow in the standing waves 20,21. Thus, the required baffling is provided for elimination of undesired turbulence in the standing waves 20, 21 (i.e., turbulence that produces nonuniformity in the height across the width of each of the standing waves and thickness thereof). The width of the standing waves 20, 21, as discussed herein, is visible in FIG. 5 and in the longest dimension thereof, the other dimensions are the thicknesses which are clearly visible in cross section in FIG. 9. The height of the standing waves are also clearly visible in FIG. 9 wherein the exemplary height of approximately one-half inch is shown by solid lines for a rate of movement of 5 feet per minute of the circuit boards 11 on conveyor 14.

The pumping of molten solder 52 draws solder from below the inlet 55 and near the bottom of tank 50. This arrangement eliminates possibility of dross and scum pickup which dross and scum is continuously being produced (oxidation) on the surface of the heated molten solder 52. It is important therefore, that the solder intake 55 be located a substantial distance from the surface of the molten solder 52 at all times and preferably near to the bottom of the tank 50 to avoid drawing dross from the surface. It should be noted that no contaminates are normally present at the bottom of the outer tank because of the high specific gravity of the solder relative to possible contaminates which float on the molten solder. Further, maintaining the solder level is less critical than when a solder intake is located near the surface of the molten solder as disclosed by prior soldering machines. Since a primary requisite for reliability of soldered connections of circuit boards 11 is to avoid drawing of any dross or other molten solder surface deposits including foreign matter into solder waves 20, 21, it is considered essential to provide a soldering machine which effectively prevents such dross or deposits from being drawn through the inner tank 54 and ducts 56, 57 and such prevention extends to avoiding accidental or unintentional introduction of dross or deposits into the solder flow through the inner tank 54 and ducts 56, 57 whenever possible, e.g., prevention of accidental drawing of dross because of a slight lowering of level of the molten solder 52 during soldering operation which involves the consumption of solder applied and bonded to copper of circuit boards 11.

The drawing of molten solder 52 into the inner, pressure tank 54 by the driven propeller 60 produces a pressure buildup therein which results in the production of an elevated mass of solder flowing over the upper edges of the ducts 56, 57 and return flow into the outer solder tank 50 wherein the height of the elevated mass, i.e., standing waves 20, 21 increases with the speed setting of the pump variable speed pulley 58b and the resulting speed of the propeller 60. As noted supra, the pump provides for a constant speed at any selected pulley speed setting to provide the desired height of the standing waves 20, 21 at the corresponding pulley setting.

Any turbulence produced by the propeller 60 is reduced to a nominal level in the inner tank 54 by the baffle action produced during flow of solder from intake 55 and around to the bottom of ducts 55, 56. This flow relies upon pressure buildup in inner tank 54 rather than direct pumping down a tube and into a solder duct. Any turbulence occurring within the inner tank 54, or pressure differential across the width of the lower portions of ducts 56, 57 is not transmitted through perforated plates 56a, 57a which uniformly distribute the flow in the upper portions of the respective ducts 56, 57 to produce standing waves 20, 21 of even, uniform level across the widths of the respective waves.

The agitator 70, in addition to providing improved "wetting action" and bonding of the solder to avoid pin holes and voids also decreases surface tension of the solder being applied to the boards 11 by the minute pulsations and vibration of the solder molecules to further improve the "wetting action" of the solder on the boards 11, component leads and in eyelets or openings in the boards 11. In penetration of openings, the vibration promotes "through-hole" soldering by forcing the solder to penetrate the openings passing leads, plated openings, and eyelets. Even under adverse conditions, such as oxidized or otherwise contaminated surfaces of component leads, copper-clad patterns on the underside of the boards 11, eyelets or through-plated openings (copper-clad or otherwise plated for soldering inside openings), uniform wetting and bonding of solder is produced. Further, the solder is forced by vibration to penetrate openings to produce the fillets around component leads passing through said openings. Also, the vibration produced by the agitator during the soldering process substantially eliminates flux entrapment on the boards 11, or in openings thereof.

In the light of the above teachings, various modifications and variations of the present invention are contemplated and will be apparent to those skilled in the art without departing from the spirit and scope of the invention.

I claim:

1. A soldering machine comprising:
   an outer tank for holding a supply of molten solder;
   an inner pressure tank disposed in said outer tank having an intake opening disposed in said supply of molten solder;
   solder duct means comprising a duct having an inlet disposed in said pressure tank and an outlet, said duct inlet projecting a substantial distance into and across said pressure tank and across the direction of flow of solder therein from said intake to avoid direct flow and any turbulence of solder in the duct inlet from said intake whereby pressure created in said duct provides a more uniform flow of molten solder through said duct; and
   means for producing a flow of molten solder from said outer tank and into said inner tank through said intake to produce said pressure in said inner tank.

2. The solder machine according to claim 1 in which said duct projects above said pressure tank and the level of the supply of solder in said outer tank, said duct being of approximately uniform width along its major lateral axis and tapered along the other lateral axis to provide an elongated orifice at said outlet to produce a free-standing vertical wave of solder of substantially equal height across the major axis in response to pressure produced in said inner tank capable of raising the level of said solder above said orifice.

3. The solder machine according to claim 2 in which the solder duct means includes means for adjusting the length of the minor axis of the duct orifice to vary the orifice opening and the narrow dimension of said standing solder wave.

4. The solder machine according to claim 1 in which an apertured member is disposed diagonally across the interior of said duct, said diagonally disposed apertured member having a larger area than the cross-sectional area of the duct at the position of said member in said duct whereby any turbulence in said pressure tank and coupled through the duct inlet and into the duct is substantially decreased in passing through said member to provide a more uniform flow of solder through said duct without undue restriction to solder flow therethrough to said outlet.

5. The soldering machine of claim 1 in which said solder duct means includes a plurality of parallel individual ducts projecting above the level of said solder and respective elongated orifices for producing a plurality of elongated parallel, and individual standing solder waves from said orifices.

6. The soldering machine of claim 1 in which agitator means are provided for producing low frequency vibrations in said molten solder supplied by said flow of solder through said duct.

7. The soldering machine of claim 6 in which the frequency of vibrations is in the approximate range of 200 to 500 vibrations per minute.

8. The soldering machine of claim 2 which further includes conveyor means for transporting circuit boards over said solder wave to apply solder to the underside of said circuit boards, said conveyor including a plurality of moveable parallel link belts for transporting said circuit boards having spaces between links providing spaced openings; and carrier means comprising a frame for carrying said printed circuit boards, said frame having a plurality of pins projecting from the underside of the frame and on opposite sides thereof to be received by at least a corresponding opening in respective ones of said link belts for coupling said frame to said link belt and transporting the printed circuit board over said solder wave.